(12) United States Patent
Watanabe et al.

(10) Patent No.: US 9,027,834 B2
(45) Date of Patent: May 12, 2015

(54) CARD READER

(75) Inventors: Takeki Watanabe, Nagano (JP); Toshio Tatai, Nagano (JP); Koji Oguchi, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/577,792

(22) PCT Filed: Feb. 24, 2011

(86) PCT No.: PCT/JP2011/054075
§ 371 (c)(1),
(2), (4) Date: Aug. 8, 2012

(87) PCT Pub. No.: WO2011/105467
PCT Pub. Date: Sep. 1, 2011

(65) Prior Publication Data
US 2012/0307499 A1    Dec. 6, 2012

(30) Foreign Application Priority Data

Feb. 26, 2010 (JP) .................................. 2010-041325

(51) Int. Cl.
| | | |
|---|---|---|
| G06K 7/00 | (2006.01) | |
| G06K 13/08 | (2006.01) | |
| G06K 7/08 | (2006.01) | |

(52) U.S. Cl.
CPC ......... *G06K 13/08* (2013.01); *G06K 7/08* (2013.01); *G06K 7/084* (2013.01)

(58) Field of Classification Search
USPC ............ 362/253, 85, 89, 154, 559, 600, 97.1; 235/449, 380, 451, 435, 439, 454, 455, 235/375; 220/4, 21–47.24, 4.31
See application file for complete search history.

(56) References Cited

U.S. PATENT DOCUMENTS

| | | | | |
|---|---|---|---|---|
| 5,698,832 | A * | 12/1997 | Someya et al. | 235/449 |
| 6,176,426 | B1 * | 1/2001 | Kanayama et al. | 235/449 |
| 6,641,034 | B1 * | 11/2003 | Oki et al. | 235/380 |
| 6,923,372 | B2 * | 8/2005 | Hirasawa et al. | 235/449 |
| 2005/0269321 | A1 * | 12/2005 | Bornhof et al. | 220/4.21 |

FOREIGN PATENT DOCUMENTS

| | | |
|---|---|---|
| JP | 63-191293 A | 8/1988 |
| JP | 7-141851 A | 6/1995 |
| JP | 2004-185513 A | 7/2004 |
| JP | 2007-141023 A | 6/2007 |
| JP | 2007-272321 A | 10/2007 |
| JP | 4257115 B2 | 2/2009 |

OTHER PUBLICATIONS

International Search Report for International Application No. PCT/JP2011/054075, dated Apr. 5, 2011, with English translation.

* cited by examiner

*Primary Examiner* — Diane Lee
*Assistant Examiner* — Kenny C Sokolowski
(74) *Attorney, Agent, or Firm* — Cantor Colburn LLP

(57) ABSTRACT

Provided is a card reader capable of increasing visibility over the prior art for a location into which a card is actually inserted. A card reader is provided with a main body frame constituting a card passage through which an inserted card passes, and a light source for illuminating the interior of the card passage. With this card reader, the light source is illuminating the interior of the card passage through which the card passes, and therefore, it is possible to brighten the interior of the card passage through which the card passes. Therefore, it is possible to brighten the location into which the card is actually inserted so that it is easier to visually confirm the location into which the card is actually inserted.

4 Claims, 7 Drawing Sheets

CARD READER

CROSS REFERENCE TO RELATED APPLICATIONS

This is a U.S. national stage of International Application No. PCT/JP2011/054075, filed on Feb. 24, 2011. Priority under 35 U.S.C. §119(a) and 35 U.S.C. §365(b) is claimed from Japanese Application No. 2010-041325, filed Feb. 26, 2010, the disclosures of which are also incorporated herein by reference.

TECHNICAL FIELD

The present invention relates to a card reader which performs a predetermined processing on an inserted card.

BACKGROUND

Conventionally, a card reader which performs a predetermined processing on an inserted card is mounted and used in a host device such as an ATM (Automate Teller Machine). The present applicant has proposed this type of a card reader in which its insertion port for a card is illuminated (see, for example, Patent Literature 1).

The card reader described in Patent Literature 1 includes a gate frame formed with an insertion port (gate port) for a card and the gate port is formed with an enlarging opened part which is inclined so as to be widened toward a front side of the card reader. Further, the card reader includes a plurality of light sources for illuminating a front face and the enlarging opened part of the gate frame and the front face and the enlarging opened part of the gate frame formed of a light transmissive member that transmits light are illuminated. In other words, the card reader is structured so that the front face and the enlarging opened part of the gate frame are illuminated to irradiate the front side of the gate port. Further, Patent Literature 1 also discloses that the front face and the enlarging opened part of the gate frame may be illuminated by using one light source and a light guiding member instead of using a plurality of light sources.

[PTL 1] Japenese Patent No. 4257115

In the card reader described in Patent Literature 1, since the front face of the gate frame and the enlarging opened part of the gate port are illuminated, the gate port is easily recognized by a user. Therefore, in the card reader, a user is easy to insert a card into the gate port. However, the card reader described in Patent Literature 1 is structured so that the front face and the enlarging opened part of the gate frame are illuminated and thus the front side of the gate port is lighted up. Therefore, in the card reader, when the surroundings become very dark, although the front side of the gate port is illuminated, a portion into which a card is actually inserted is dark and thus the portion into which a card is actually inserted may be hard to be visible. In other words, in the card reader, visibility of the portion into which a card is actually inserted may be lowered depending on the surroundings.

SUMMARY

In view of the problem described above, at least an embodiment of the present invention provides a card reader in which visibility of a portion into which a card is actually inserted can be further enhanced in comparison with the conventional case.

In order to attain the above, at least an embodiment of the present invention provides a card reader including a main body frame which structures a card passage where an inserted card is passed and a light source which illuminates an inside of the card passage.

In the card reader in accordance with at least an embodiment of the present invention, the light source illuminates the inside of the card passage where a card is passed and thus the inside of the card passage where the card is passed is illuminated. In other words, the main body frame structuring the card passage is illuminated by the light from the light source and thus the inside of the card passage can be illuminated brightly. Therefore, according to at least an embodiment of the present invention, even when the surroundings are very dark, the portion into which a card is actually inserted is illuminated and thus the portion into which a card is actually inserted is visually confirmed easily. As a result, in at least an embodiment of the present invention, visibility of the portion into which a card is actually inserted is further enhanced in comparison with the conventional case.

In at least an embodiment of the present invention, it is preferable that at least a part of the main body frame is a light transmission part which is formed of a light transmissive member that transmits light, and the light source irradiates light toward the light transmission part so that the light transmission part is illuminated and thereby the inside of the card passage is illuminated. According to this structure, even when a light source is not disposed in the inside of the card passage, the inside of the card passage is illuminated. Therefore, in comparison with a case that a light source is disposed in the inside of the card passage to illuminate the inside of the card passage, the size of the card reader can be reduced while preventing interference of an inserted card with the light source.

In at least an embodiment of the present invention, it is preferable that the whole of the main body frame is the light transmission part which is formed of the light transmissive member. According to this structure, in comparison with a case that the main body frame is structured of a member which does not transmit light and the light transmissive member, the structure of the main body frame can be simplified. Further, according to this structure, the inside of the card passage is illuminated by utilizing light propagating the whole of the main body frame and thus a degree of freedom of arrangement of the light source can be enhanced. In addition, according to this structure, when a foreign matter is jammed in the card passage, the foreign matter can be visually confirmed.

In at least an embodiment of the present invention, it is preferable that the light source is disposed at a position where light is irradiated toward the light transmission part in a thickness direction of the card which is substantially perpendicular to a passing direction of the card. According to this structure, the inside of the card passage is further easily illuminated.

In at least an embodiment of the present invention, the card reader includes, for example, a front face frame which is formed with a card insertion port into which the card is inserted, and the front face frame is attached to a front face side of the main body frame. In this case, it is preferable that, when viewed from the front face side of the card reader, a part of the main body frame is visible through the card insertion port. According to this structure, even when the front face frame is attached to the front face side of the main body frame structuring the card passage, a portion on an adjacent rear side of the card insertion port is illuminated and thus the portion into which a card is actually inserted is visually confirmed easily.

In at least an embodiment of the present invention, it is preferable that the card reader includes a front face frame which is formed with a card insertion port into which the card is inserted and is attached to a front face side of the main body frame and a sealing member which is disposed between the front face frame and the main body frame and, when a front face side of the card reader is referred to as a front side and a rear face side of the card reader is referred to as a rear side, the main body frame is provided with a card accommodation part in a bag-like shape into which a rear side of the card being inserted through the card insertion port is accommodated, and the sealing member is disposed on a front side with respect to the card accommodation part, and the light source is disposed on a rear side with respect to the sealing member and is disposed on an outer side with respect to the card accommodation part. According to this structure, liquid entered through the card insertion port is prevented from entering to an arranging portion of the light source which is disposed on the rear side with respect to the sealing member and on the outer side of the card accommodation part. Therefore, the card reader in which visibility of the portion into which a card is actually inserted is further enhanced in comparison with the conventional case can be used under an environment where liquid is used.

In at least an embodiment of the present invention, the card reader is, for example, structured so that, when insertion of the card into the card reader is completed, a part of the card is exposed on a front face side of the card reader. In at least an embodiment of the present invention, since the inside of the card passage can be illuminated, according to this structure, a card which is inserted into the card reader is easily confirmed by visual observation. Therefore, a sense of security that an inserted card is not stolen illegally can be given to a user who has inserted the card.

As described above, according to at least an embodiment of the present invention, visibility of the portion into which a card is actually inserted is further enhanced in comparison with the conventional case.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention will be described below with reference to the accompanying drawings.

(Structure of Card Reader)

Figure 1:
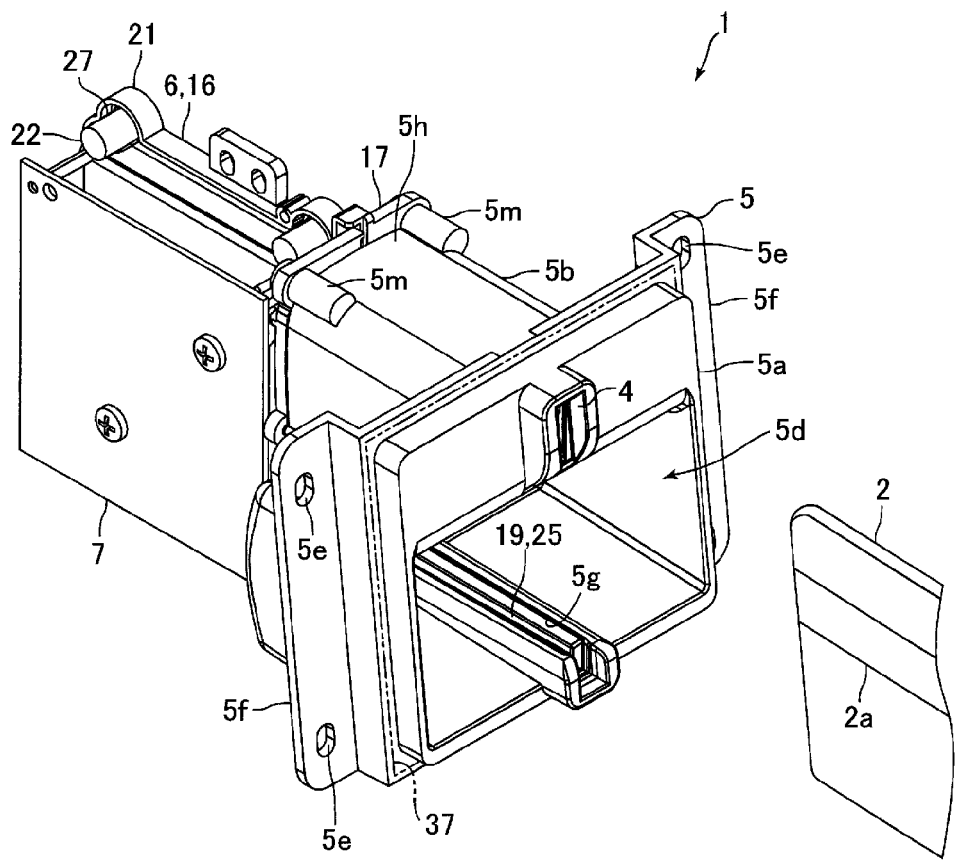
FIG. 1 is a perspective view showing a card reader in accordance with an embodiment of the present invention.
Figure 2:
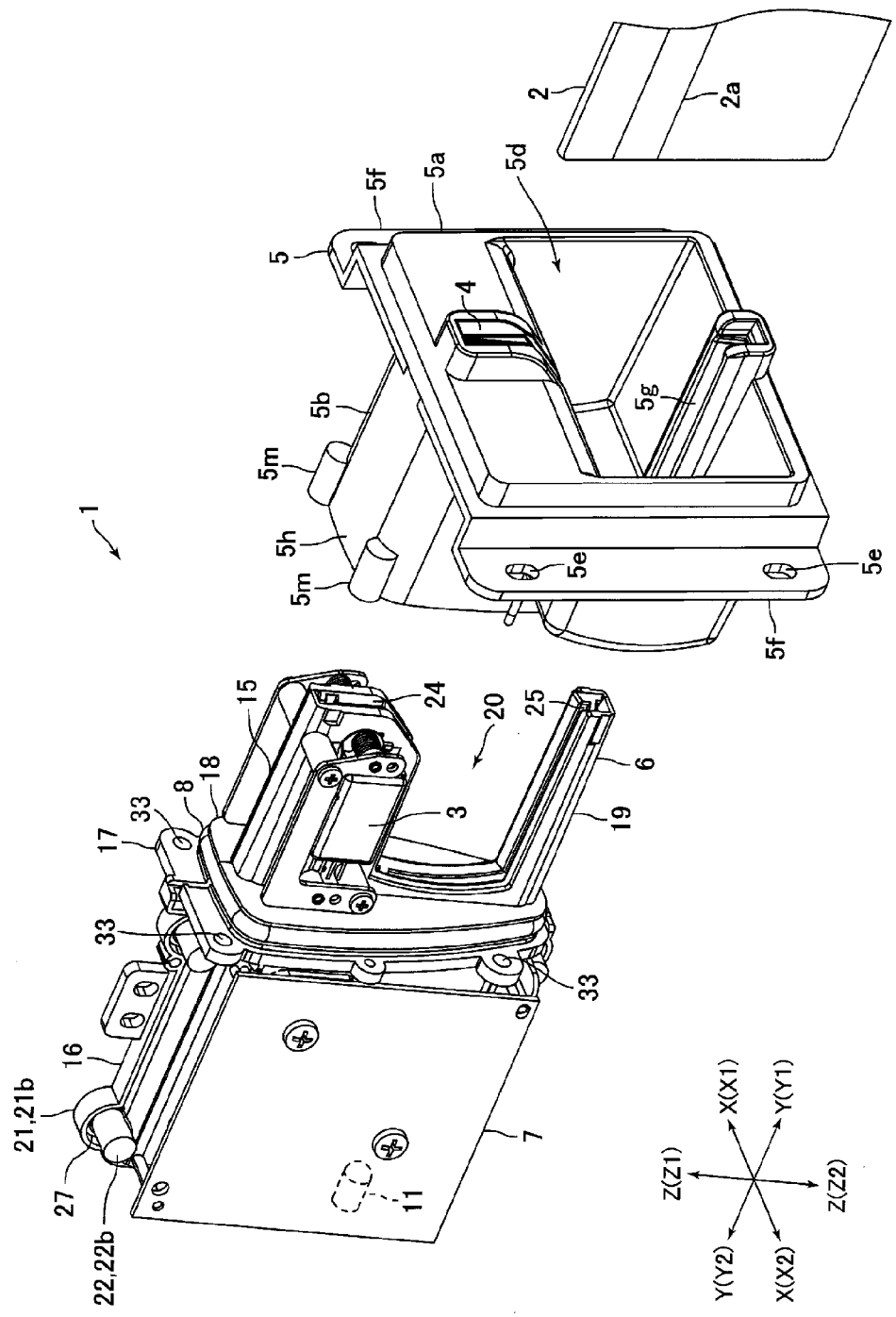
FIG. 2 is an exploded perspective view showing the card reader in FIG. 1.
Figure 3:
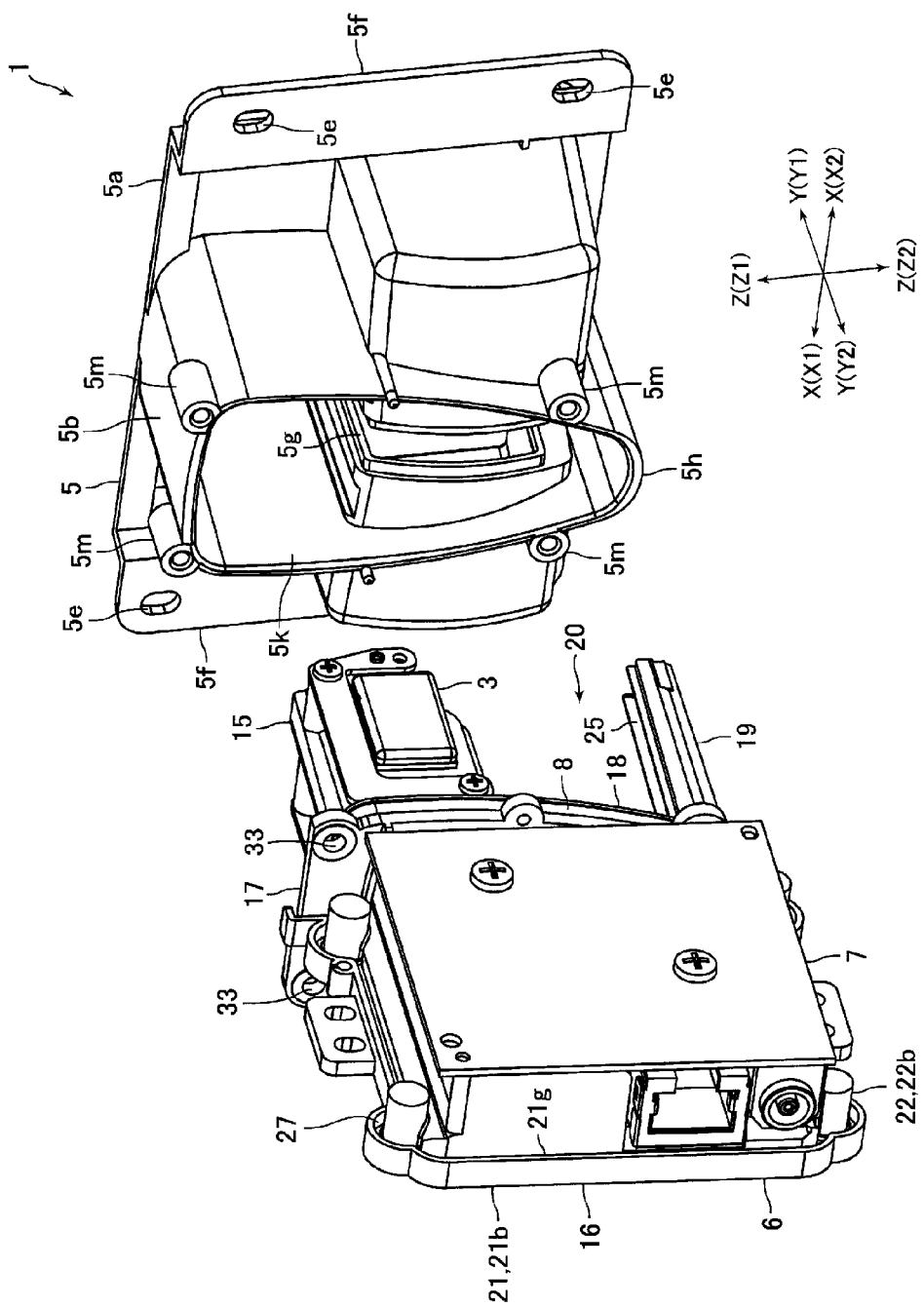
FIG. 3 is an exploded perspective view showing the card reader in FIG. 1 which is viewed in a different direction.
Figure 4:
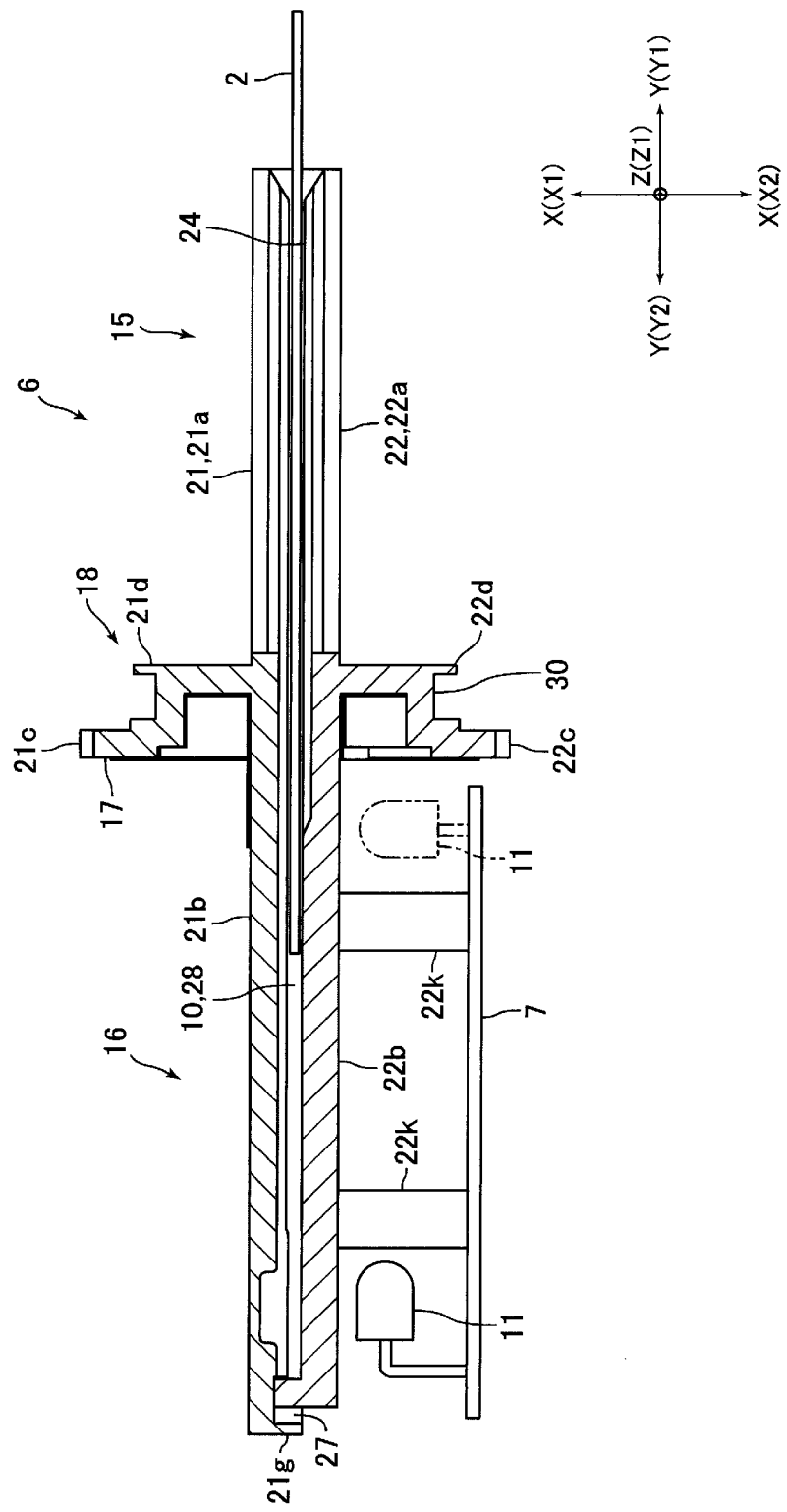
FIG. 4 is a cross-sectional view for explaining an internal structure of a main body frame shown in FIG. 1.
Figure 5A:
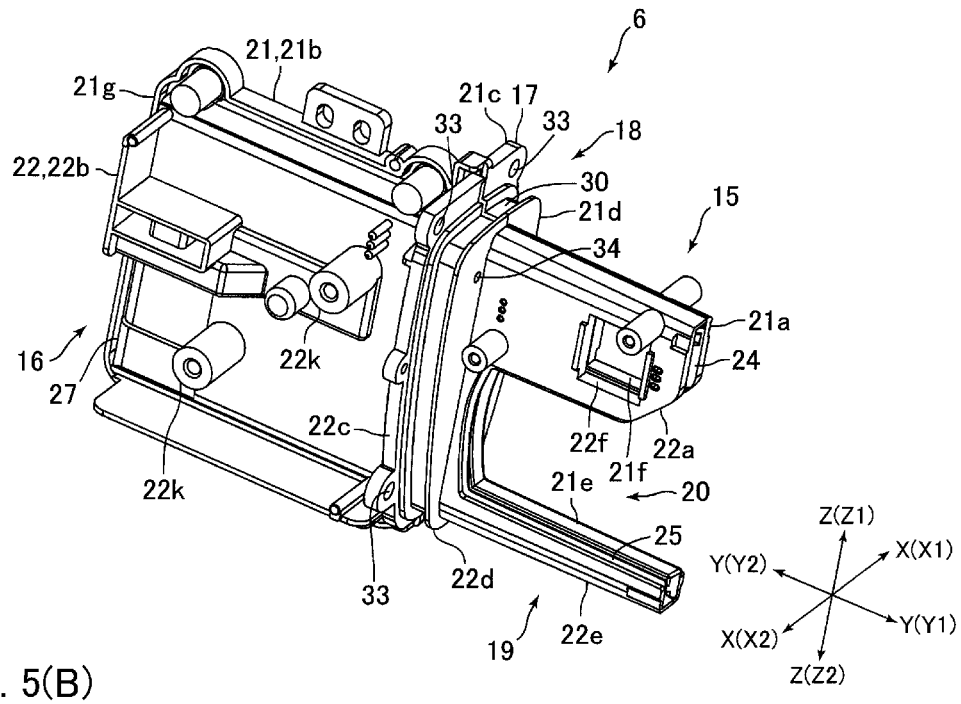
FIGS. 5(A) and 5(B) are perspective views for explaining a structure of the main body frame shown in FIG. 1.
Figure 5B:
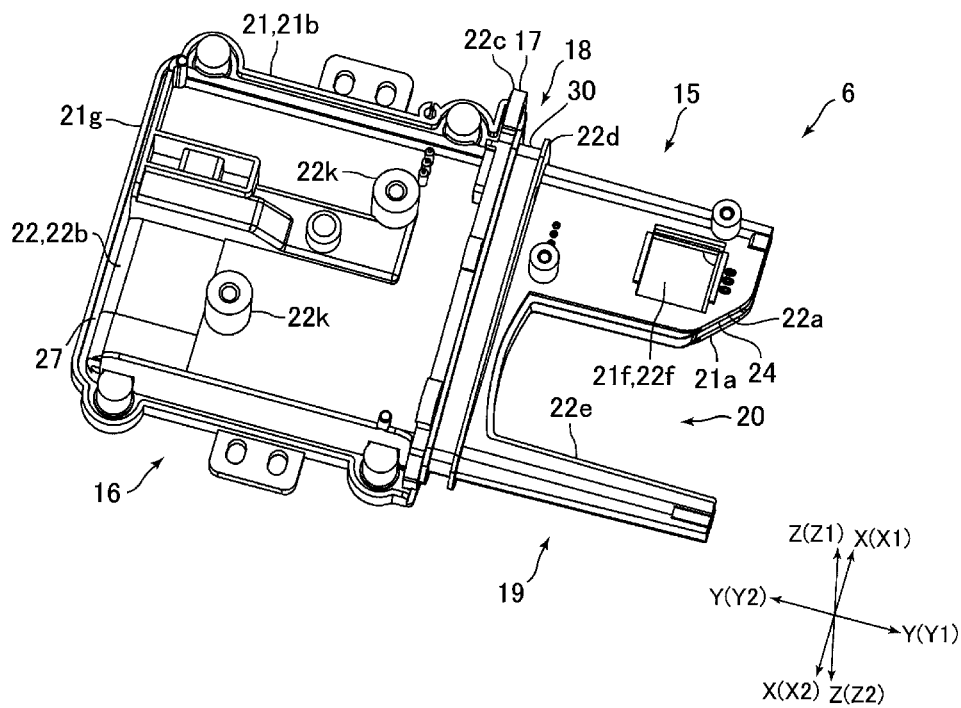

FIG. 1 is a perspective view showing a card reader 1 in accordance with an embodiment of the present invention. FIG. 2 is an exploded perspective view showing the card reader 1 in FIG. 1. FIG. 3 is an exploded perspective view showing the card reader 1 in FIG. 1 which is viewed in a different direction. FIG. 4 is a cross-sectional view for explaining an internal structure of a main body frame 6 shown in FIG. 1. FIGS. 5(A) and 5(B) are perspective views for explaining a structure of the main body frame 6 shown in FIG. 1.

The card reader 1 in this embodiment is a device in which magnetic information recorded on a card 2 is read by manually operating the card 2 by a user. Specifically, the card reader 1 is a so-called dip type card reader in which magnetic information of a card 2 is read when the card 2 is inserted into the card reader 1 or when the card 2 having been inserted into the card reader 1 is pulled out. The card reader 1 is, for example, mounted and used in a host device such as a fueling machine of an unmanned or a self-service type gasoline station.

The card reader 1 includes, as shown in FIGS. 1 through 4, two magnetic heads 3 which are abutted with a card 2 for reading magnetic information recorded on the card 2, a front face frame 5 which is formed with a card insertion port 4 into which a card 2 is inserted, a main body frame 6 to which the front face frame 5 is fixed, a control circuit board 7 for controlling the card reader 1, and a sealing member 8 which is formed in a ring shape and is disposed between the front face frame 5 and the main body frame 6. A card passage 10 through which an inserted card 2 is passed is formed in an inside of the main body frame 6. Further, the card reader 1 includes one light source 11 by which an inside of the card passage 10 is illuminated.

In the following descriptions, as shown in FIG. 1 and the like, respective three directions perpendicular to each other are referred to as an "X" direction, a "Y" direction and a "Z" direction. Further, an "X1" direction side in FIG. 1 is referred to as a "right" side, an "X2" direction side is referred to as a "left" side, a "Y1" direction side as a "front" side, a "Y2" direction side as a "back (rear)" side, a "Z1" direction side as an "upper" side, and a "Z2" direction side as a "lower" side. In this embodiment, a card 2 is inserted into the inside of the card reader 1 in the "Y2" direction. Further, the card 2 inserted into the inside of the card reader 1 is pulled out in the "Y1" direction. In other words, in this embodiment, the "Y" direction is a passing direction of a card 2. Further, the "X" direction is a thickness direction of an inserted card 2.

A card 2 is, for example, a rectangular card made of vinyl chloride whose thickness is about 0.7-0.8 mm. The card 2 is formed with a magnetic stripe 2a in which magnetic data are recorded. The card 2 may be a PET (polyethylene terephthalate) card whose thickness is about 0.18-0.36 mm, a paper card having a predetermined thickness or the like.

The main body frame 6 is provided with a head disposing part 15 in which the magnetic head 3 is disposed, a bag-shaped card accommodation part 16 which accommodates a rear end side of a card 2 which is inserted through a card insertion port 4, a partition part 17 which is formed between the head disposing part 15 and the card accommodation part 16, a seal disposing part 18 which is formed between the head disposing part 15 and the partition part 17 for disposing the sealing member 8, and a card guide part 19 for guiding a card 2 inserted through the card insertion port 4.

As shown in FIGS. 5(A) and 5(B), the head disposing part 15 and the card guide part 19 are formed so as to protrude to a front side from the seal disposing part 18. Further, the head disposing part 15 is disposed on an upper end side of the main body frame 6 and the card guide part 19 is disposed on a lower end side of the main body frame 6. A cutout part 20 is formed between the head disposing part 15 and the card guide part 19 in an upper and lower direction.

The main body frame 6 in this embodiment is structured of a first frame 21 and a second frame 22 which are divided into two pieces in a right and left direction. In this embodiment, a right side face part of the main body frame 6 is structured by the first frame 21 and a left side face part of the main body frame 6 is structured by the second frame 22. The first frame 21 and the second frame 22 are fixed to each other by using screws (not shown) disposed at four corners of the card accommodation part 16.

The first frame 21 and the second frame 22 are formed of a light transmissive member which transmits light. In this embodiment, it is preferable that the light transmissive member which forms the first frame 21 and the second frame 22 is provided with a function transmitting light and guiding and diffusing light by reflection and the like through the inside of the light transmissive member. Therefore, specifically, the first frame 21 and the second frame 22 is formed of transparent or translucent resin material such as polycarbonate or polyacetal. Further, the first frame 21 and the second frame 22 are formed by molding. In this embodiment, the entire first frame 21 and the entire second frame 22 are a light transmission part formed of a light transmissive member. In other words, the entire main body frame 6 is a light transmission part.

The first frame 21 is provided with a first head disposing part 21a structuring a part of the head disposing part 15, a first accommodation frame part 21b structuring a part of the card accommodation part 16, a first partition part 21c structuring a part of the partition part 17, a first seal disposing frame part 21d structuring a part of the seal disposing part 18, and a first card guide frame part 21e structuring a part of the card guide part 19.

The second frame 22 is provided with a second head disposing part 22a structuring the head disposing part 15 together with the first head disposing part 21a, a second accommodation frame part 22b structuring the card accommodation part 16 together with the first accommodation frame part 21b, a second partition part 22c structuring the partition part 17 together with the first partition part 21c, a second seal disposing frame part 22d structuring the seal disposing part 18 together with the first seal disposing frame part 21d, and a second card guide frame part 22e structuring the card guide part 19 together with the first card guide frame part 21e.

Disposing holes 21f and 22f for disposing the magnetic heads 3 are formed in the first head disposing part 21a and the second head disposing part 22a. Further, a card guide groove 24 for guiding a right end side of a card 2 inserted through the card insertion port 4 is formed between the first head disposing part 21a and the second head disposing part 22a. Two magnetic heads 3 are disposed in the first head disposing part 21a and the second head disposing part 22a so that their magnetic gap parts for abutting with a magnetic stripe 2a when magnetic information is read are faced each other in the card guide groove 24. In other words, the magnetic heads 3 are attached to the first head disposing part 21a and the second head disposing part 22a through predetermined attaching members so that their magnetic gap parts face the card guide groove 24.

A card guide groove 25 for guiding a left end side of a card 2 inserted through the card insertion port 4 is formed between the first card guide frame part 21e and the second card guide frame part 22e.

The first accommodation frame part 21b and the second accommodation frame part 22b are formed in a roughly rectangular shape when viewed in the right and left direction. A front end of the first accommodation frame part 21b is abutted with the first partition part 21c. Further, a front end of the second accommodation frame part 22b is abutted with the second partition part 22c.

The first accommodation frame part 21b and the second accommodation frame part 22b are joined to each other in the both end sides in the upper and lower direction and the rear end side. Specifically, an outer peripheral end wall part 21g standing up toward the left side is formed in both ends in the upper and lower direction and the rear end of the first accommodation frame part 21b. The first accommodation frame part 21b and the second accommodation frame part 22b are joined to each other in a state that both ends in the upper and lower direction and the rear end of the second accommodation frame part 22b are disposed on an inner peripheral side of the outer peripheral end wall part 21g.

As shown in FIGS. 5(A) and 5(B), other portion except for the outer peripheral end portion of the second accommodation frame part 22b is protruded in the left direction and a groove part 27 is formed along the outer peripheral end wall part 21g in both end portions in the upper and lower direction and the rear end portion of the card accommodation part 16. The groove part 27 is filled with sealing material (not shown) such as silicon for sealing the joining part of the first accommodation frame part 21b to the second accommodation frame part 22b. Therefore, in this embodiment, an accommodation space 28 for a card 2 which is sealed (see FIG. 4) is formed between the first accommodation frame part 21b and the second accommodation frame part 22b.

As described above, the card passage 10 is formed in the inside of the main body frame 6. In other words, the card passage 10 is structured of the first frame 21 and the second frame 22 structuring the main body frame 6. In this embodiment, the card passage 10 is structured of the card guide grooves 24 and 25, the accommodating space 28, and space portions which are formed on a center side of the partition part 17 and a center side of the seal disposing part 18 so as to connect the card guide grooves 24 and 25 with the accommodating space 28. The card passage 10 is formed of wall faces which are substantially parallel to an "X-Y" plane formed of the "X" direction and the "Y" direction and wall faces which are substantially parallel to a "YZ" plane formed of the "Y" direction and the "Z" direction. In other words, the card passage 10 is formed of wall faces which are substantially parallel to the surfaces of an inserted card 2 and wall faces which are substantially parallel to the end faces in a short side direction of the inserted card 2 (the end faces in the upper and lower direction).

Two board fixing protruded parts 22k are formed on a left side face of the second accommodation frame part 22b for fixing the control circuit board 7. One of the board fixing protruded parts 22k is formed on an upper front end side of the second accommodation frame part 22b and the other of the board fixing protruded parts 22k is formed on a lower rear end side of the second accommodation frame part 22b. The control circuit board 7 is fixed to a left end of the board fixing protruded part 22k and is disposed on an outer side with respect to the card accommodation part 16.

The first seal disposing frame part 21d is formed in a flange-like shape which is extended to both sides in the upper and lower direction and to the right side and the second seal disposing frame part 22d is formed in a flange-like shape which is extended to both sides in the upper and lower direction and to the left side. In other words, the seal disposing part 18 is formed in a flange-like shape which is extended to both sides in the upper and lower direction and to both sides in the right and left direction. Further, the seal disposing part 18 is formed in a roughly semi-elliptic shape so that its upper end side when viewed in the front and rear direction is wider in the right and left direction and its lower end side is narrower in the right and left direction.

A seal disposing groove 30 on which the sealing member 8 is disposed is formed on an outer peripheral face of the seal disposing part 18. Specifically, the seal disposing groove 30 is formed so as to be recessed toward an inner side in the radial direction of the seal disposing part 18. In this embodiment, the seal disposing groove 30 is formed so that an outer peripheral end of the sealing member 8 is protruded to an outer side in the radial direction with respect to the seal disposing part 18.

The first partition part 21c is formed in a flange-like shape so as to be further extended to both sides in the upper and lower direction and to the right side with respect to the first seal disposing frame part 21d and the second partition part 22c is formed in a flange-like shape so as to be further extended to both sides in the upper and lower direction and to the left side with respect to the second seal disposing frame part 22d. In other words, the partition part 17 is formed in a flange-like shape so as to be further extended to both sides in the upper and lower direction and to both sides to the right and left direction with respect to the seal disposing part 18.

An insertion hole 33 into which a screw (not shown) for fixing the front face frame 5 is inserted is formed at four positions on the upper end side and the lower end side of the partition part 17. Specifically, the insertion hole 33 is formed so as to be disposed on an outer side in a radial direction with respect to the sealing member 8 which is disposed in the seal disposing part 18. Further, the partition part 17 and the seal disposing part 18 are formed with a passing hole 34 (see FIG. 5(A)) through which lead wires for the magnetic head 3 are passed. Specifically, the passing hole 34 is formed on an inner peripheral side of the partition part 17 and the seal disposing part 18 with respect to the sealing member 8. The passing hole 34 is filled with sealing material (not shown) such as silicon for sealing the passing hole 34 in a state that the lead wires are passed. In this embodiment, the lead wires extended from the magnetic head 3 are electrically connected with the control circuit board 7.

The front face frame 5 is formed of a member which does not transmit light. For example, the front face frame 5 is formed of black resin material. The front face frame 5 is, as shown in FIGS. 2 and 3, provided with a front face part 5a structuring a front face of the card reader 1, a tube part 5b in a substantially tube-like shape which is formed toward the rear side from the front face part 5a so as to be connected with the front face part 5a, and a finger insertion part 5d which is formed so as to be recessed to the rear side from the front face part 5a. The front face frame 5 in this embodiment is provided with no opening portion except the card insertion port 4 formed in the front face of the front face part 5a, the rear end of the tube part 5b and an opening part 5g described below.

The front face part 5a is disposed to an opening part 37 (see FIG. 1) formed in a front panel (not shown) of a host device on which the card reader 1 is mounted. The front face part 5a structures a part of the front panel of the host device. The front face part 5a is provided with a fixing part 5f formed with insertion holes 5e into which a screw (not shown) is inserted for fixing the card reader 1 to the host device. In this embodiment, the front face part 5a is fixed to the front panel of the host device through a predetermined sealing member so that liquid such as water is not entered through the opening part 37 of the front panel to the rear side of the front panel.

The card insertion port 4 is formed in the front face of the front face part 5a. Specifically, the card insertion port 4 is formed in the front face of the front face part 5a so that a card 2 inserted from the card insertion port 4 is passed on an inner peripheral side of the tube part 5b.

The head disposing part 15 and the card guide part 19 are disposed on an inner peripheral side of the tube part 5b. Further, a rear end side portion of the tube part 5b is a seal pressing part 5h which crushes the sealing member 8 in a radial direction from an outer peripheral side of the sealing member 8.

The seal pressing part 5h is formed in a substantially tube-like shape whose shape viewed in the front and rear direction has a similar figure to a shape of the seal disposing part 18 when viewed in the front and rear direction. Specifically, the seal pressing part 5h is formed in a tube-like shape whose shape when viewed in the front and rear direction is a roughly semi-elliptic shape which is slightly larger than an external shape of the seal disposing part 18 when viewed in the front and rear direction.

An inner peripheral face 5k of the seal pressing part 5h (see FIG. 3) is formed in a tapered shape toward the rear side which is widened to an outer side in the radial direction of the seal pressing part 5h. Further, a screw engaging part 5m with which a screw inserted into the insertion hole 33 of the partition part 17 is threadedly engaged is formed at four positions on an upper end side and a lower end side of an outer peripheral face of the seal pressing part 5h. The screw engaging part 5m is formed in a substantially cylindrical tube shape and a female screw is formed on its inner peripheral face. In this embodiment, the front face frame 5 is fixed to a front face side of the main body frame 6 in a state that the head disposing part 15 and the card guide part 19 are disposed in the inside of the tube part 5b and that the front face of the partition part 17 and the rear end of the tube part 5b (in other words, the rear end of the seal pressing part 5h) are abutted with each other.

The finger insertion part 5d is formed so as to be widened on both sides in the right and left direction of the tube part 5b. Specifically, the finger insertion part 5d is formed so that box-shaped portions in a substantially rectangular prism shape whose inner side faces in the right and left direction and whose front faces are opened are formed so as to be connected with the side faces in the right and left direction and the front face part 5a of the tube part 5b. An opening part 5g in a slit-like shape is formed in an upper side face, a lower side face and a rear side face of the finger insertion part 5d. Specifically, the opening part 5g in a slit-like shape is formed at a substantially center position of the upper side face and the lower side face in the right and left direction and the rear side face of the finger insertion part 5d. The opening part 5g is formed so as to be connected with the card passage 10.

The finger insertion part 5d is formed in a size such that a user's thumb and finger are capable of being inserted and, when a user inserts a card 2 into the card reader 1 and, when a user pulls out the card 2 from the card reader 1, the user's thumb and finger are inserted into the finger insertion part 5d. Further, in this embodiment, when insertion of a card 2 into the card reader 1 is completed, a part on the front end side of the card 2 is exposed in the finger insertion part 5d.

In this embodiment, when viewed from the front face side of the card reader 1, a part of the main body frame 6 is visible through the card insertion port 4 and the opening part 5g.

Specifically, when viewed from the front face side of the card reader 1, the head disposing part 15, the card guide part 19 and the like which are disposed on an inner peripheral side of the tube part 5b are visible through the card insertion port 4 and the opening part 5g (see FIG. 1). Further, when viewed from the front face side of the card reader 1, a part of the card passage 10 is visible through the card insertion port 4 and the opening part 5g.

The sealing member 8 is formed of rubber or the like. Further, the sealing member 8 is formed in a roughly semi-elliptic shape so that, when viewed in the front and rear direction, its upper end side is wider in the right and left direction and its lower end side is narrower in the right and left direction. Specifically, the sealing member 8 is formed in a substantially tube-like shape whose shape viewed in the front and rear direction has a similar figure to the shapes of the seal disposing groove 30 and the seal pressing part 5h when viewed in the front and rear direction.

The sealing member 8 is disposed on the seal disposing groove 30 and is crushed by the inner peripheral face 5k of the seal pressing part 5h toward the inner side from the outer side in the radial direction. In other words, an inner peripheral face of the sealing member 8 is abutted with a bottom face of the seal disposing groove 30 at a predetermined abutting pressure and an outer peripheral face of the sealing member 8 is abutted with an inner peripheral face 5k of the seal pressing part 5h at a predetermined abutting pressure.

The light source 11 is an LED (Light Emitting Diode). The light source 11 is mounted on the rear end side of the control circuit board 7 as shown by the solid line in FIG. 4. Further, the light source 11 is disposed on an outer side with respect to the card accommodation part 16. Further, as shown in FIG. 4, in this embodiment, the light source 11 is mounted on the control circuit board 7 so as to emit light toward the board fixing protruded part 22k formed on the lower rear end side. Specifically, the light source 11 is disposed on a rear side with respect to the board fixing protruded part 22k formed on the lower rear end side and the light source 11 emits light to a front direction toward the board fixing protruded part 22k from the rear side with respect to the board fixing protruded part 22k.

In the card reader 1 structured as described above, when light emitted from the light source 11 is irradiated to the board fixing protruded part 22k, the irradiated light propagates the entire main body frame 6 and the whole of the main body frame 6 is illuminated. Specifically, a front side portion of the main body frame 6 with respect to the light source 11 is illuminated further brightly. Further, when the light is emitted from the light source 11, the whole of the main body frame 6 is illuminated and thus the inside of the card passage 10 is also illuminated. Further, since the front face frame 5 is formed of resin material which does not transmit light, when the card reader 1 is viewed from the front side at the time of emitting light from the light source 11, the card passage 10 on the rear side and the like with respect to the card insertion port 4 and the opening part 5g is illuminated to be visible.

In this embodiment, for example, when a host device detects a user by a detection mechanism of the host device on which the card reader 1 is mounted, light is emitted from the light source 11 and the main body frame 6 is illuminated. On the other hand, a predetermined processing for a card 2 is completed and, when the user is moved away from the host device, emission of the light from the light source 11 is stopped. When light is to be emitted, the light source 11 may emit light continuously or intermittently (in other words, the light source 11 may be flashed). Further, a flashing speed of the light source 11 may be changed according to a processing state of a card 2 or a color of the light emitted from the light source 11 may be changed.

Principal Effects in this Embodiment

As described above, in this embodiment, when light is emitted from the light source 11, the inside of the card passage 10 is illuminated and thus the inside of the card passage 10 where a card 2 is passed is illuminated. Therefore, in this embodiment, even when the surroundings are very dark, a portion into which a card 2 is actually inserted is illuminated and thus a user is capable of visually confirming the portion into which a card 2 is actually inserted from the front side of the card reader 1. As a result, in this embodiment, visibility of the portion into which a card 2 is actually inserted is further enhanced.

In this embodiment, when the card reader 1 is viewed from the front side, a part of the main body frame 6 is visible through the card insertion port 4 and the opening part 5g. Therefore, even when the front face frame 5 is attached to the front face side of the main body frame 6, a portion on an adjacent rear side of the card insertion port 4 of the card passage 10 and a portion along the opening part 5g of the card passage 10 are illuminated. Accordingly, in this embodiment, even when the front face frame 5 is attached to the front face side of the main body frame 6, a user can easily confirm a portion into which a card 2 is actually inserted by visual observation.

In this embodiment, the light source 11 is disposed on an outer side of the card accommodation part 16 and the inside of the card passage 10 is illuminated by emitting light toward the board fixing protruded part 22k. Therefore, in comparison with a case that the light source 11 is disposed in the inside of the card passage 10 for illuminating the inside of the card passage 10, the size of the card reader 1 can be reduced in the front and rear direction while preventing interference of an inserted card 2 with the light source 11. In other words, in a case that the light source 11 is disposed in the inside of the card passage 10 for illuminating the inside of the card passage 10, the light source 11 is required to dispose on the rear side with respect to a position where the rear end of an inserted card 2 is reached so that the rear end of the inserted card 2 and the light source 11 are not interfered with each other and thus the size of the card reader 1 is increased in the front and rear direction. However, in this embodiment, the size of the card reader 1 can be reduced in the front and rear direction.

In this embodiment, the entire main body frame 6 is formed as a light transmission part which is formed of a light transmissive member. Therefore, in comparison with a case that the main body frame 6 is structured of a member which does not transmit light and the light transmissive member, the structure of the main body frame 6 is simplified. Further, according to this structure, when a foreign matter is jammed in the card passage 10, the foreign matter can be visually confirmed.

In this embodiment, light irradiated to the main body frame 6 propagates the entire main body frame 6 to illuminate the entire main body frame 6. Therefore, different from the card reader described in Patent Literature 1 in which a light source is disposed in a gate frame (front face frame 5 in this embodiment) and in which special working is performed for guiding light to the front face and the enlarging opened part of the gate frame, visibility of a portion where a card 2 is inserted can be enhanced. Further, even when a part of the front face frame 5 is not formed of a light transmissive member, visibility of the portion into which a card 2 is inserted can be enhanced.

Therefore, in this embodiment, a degree of freedom in design of the front face frame 5 can be enhanced while enhancing visibility of the portion into which a card 2 is inserted.

Further, in this embodiment, since light irradiated to the main body frame 6 propagates the entire main body frame 6 to illuminate the entire main body frame 6, even when a light guiding member described in Patent Literature 1 is not used, the inside of the card passage 10 is illuminated by one light source 11. Therefore, in this embodiment, a structure of the card reader 1 is simplified.

In this embodiment, the groove part 27 is formed in an outer peripheral end portion of the card accommodation part 16 which is a joining part of the first accommodation frame part 21*b* to the second accommodation frame part 22*b* and the groove part 27 is filled with sealing material for sealing the joining part. Further, in this embodiment, sealing material is also filled in the passing hole 34 through which the lead wires drawn out from the magnetic head 3 are passed. In addition, in this embodiment, the inner peripheral face of the sealing member 8 is abutted with the bottom face of the seal disposing groove 30 at a predetermined abutting pressure and the outer peripheral face of the sealing member 8 is abutted with the inner peripheral face 5*k* of the seal pressing part 5*h* at a predetermined abutting pressure. Therefore, in this embodiment, liquid entered through the front face of the front face frame 5 (specifically, the card insertion port 4 and the opening part 5*g*) is prevent from entering to the control circuit board 7 and an arranging portion of the light source 11 and the like which are disposed on the rear side with respect to the seal disposing part 18 and on the outer side of the card accommodation part 16. Accordingly, the card reader 1 in this embodiment whose card passage 10 is illuminated can be used under an environment where liquid is used. In other words, the card reader 1 in this embodiment in which visibility of the portion into which a card 2 is actually inserted is further enhanced can be used under an environment where liquid is used.

In this embodiment, when insertion of a card 2 to the card reader 1 is completed, a part on the front end side of the card 2 is exposed in the finger insertion part 5*d*. Further, in this embodiment, the inside of the card passage 10 is illuminated. Therefore, in this embodiment, a card 2 which is inserted into the card reader 1 is easily confirmed by visual observation. Accordingly, a sense of security that the inserted card 2 is not stolen illegally can be given to a user who inserts a card 2.

In the card reader described in Patent Literature 1, a circuit board for a light source is attached to the gate frame in which a gate port is formed. Therefore, a creepage distance between the rear end of an inserted card and the circuit board for a light source is short and thus, when a card charged with electricity is inserted into the card reader described in Patent Literature 1, a creeping discharge is generated by static electricity charged on the card and the circuit board for a light source may be damaged. On the other hand, in this embodiment, the control circuit board 7 is disposed on the rear end side with respect to the partition part 17 and thus a creepage distance between the rear end of a card 2 inserted through the card insertion port 4 and the control circuit board 7 is relatively long. Therefore, in this embodiment, even when a card 2 charged with electricity is inserted into the card reader 1, the control circuit board 7 is easy to be prevented from being damaged by static electricity charged on the card.

Other Embodiments

Although the present invention has been shown and described with reference to a specific embodiment, various changes and modifications will be apparent to those skilled in the art from the teachings herein.

In the embodiment described above, the light source 11 is disposed so as to emit light from the rear side with respect to the board fixing protruded part 22*k* formed on the lower rear end side toward the board fixing protruded part 22*k* to the front direction. However, the present invention is not limited to this embodiment. For example, as shown by the two-dot chain line in FIG. 4, the light source 11 may be disposed in the vicinity of the second partition part 22*c* and disposed so as to emit light from the left side with respect to the second accommodation frame part 22*b* toward the second accommodation frame part 22*b* to the right direction. In other words, the light source 11 may be disposed at a position irradiating light to the second accommodation frame part 22*b* in a thickness direction of a card 2 which is substantially perpendicular to a passing direction of the card 2. In this case, the inside of the card passage 10 is easily illuminated further brightly.

Further, the light source 11 may be disposed in the vicinity of the second partition part 22*c* and disposed so as to emit light from the rear side with respect to the second partition part 22*c* toward the second partition part 22*c* to the front direction. Further, the light source 11 may be disposed, as shown by the solid line in FIG. 6, so as to emit light toward the main body frame 6 in an obliquely right front side direction. Alternatively, as shown by the broken line in FIG. 6, the light source 11 may be disposed so as to emit light toward the main body frame 6 in an obliquely right rear side direction.

Figure 6:
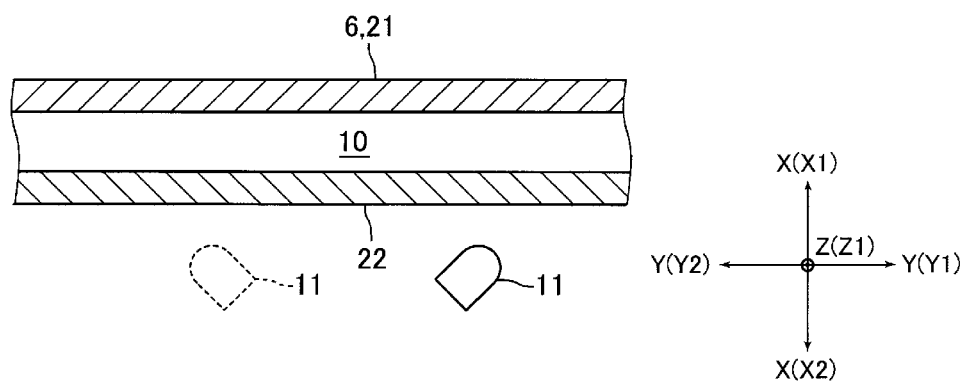
FIG. 6 is a schematic view for explaining arrangement of a light source in accordance with another embodiment of the present invention.

When the entire main body frame 6 is formed of a light transmissive member, the inside of the card passage 10 is illuminated by utilizing light propagating the entire main body frame 6. Therefore, the light source 11 may be disposed at various positions as shown in FIGS. 4 and 6. In other words, when the entire main body frame 6 is formed of a light transmissive member, a degree of freedom of arrangement of the light source 11 is enhanced. Further, since a degree of freedom of arrangement of the light source 11 is enhanced, the light source 11 can be mounted on the control circuit board 7 and thus a dedicated circuit board for the light source 11 is not required. Therefore, the structure of the card reader 1 is simplified.

Figure 7:
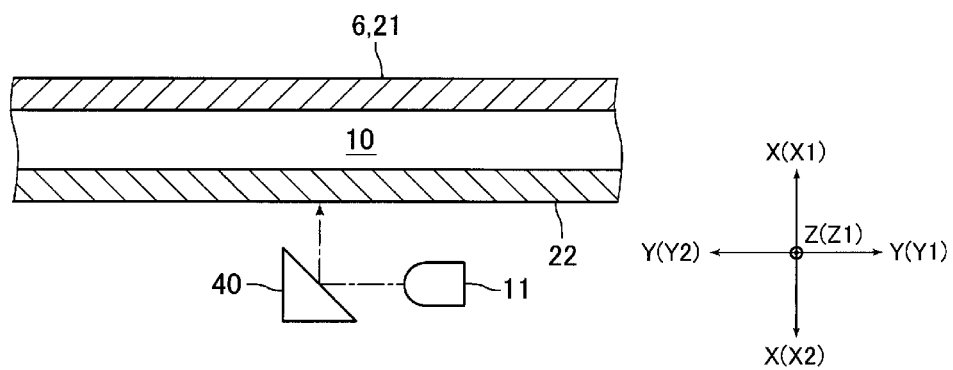
FIG. 7 is a schematic view for explaining arrangement of a light source and its surrounding part in accordance with another embodiment of the present invention.

In the embodiment described above, the light source 11 emits light toward the board fixing protruded part 22*k* formed on the lower rear end side. However, the present invention is not limited to this embodiment. For example, as shown in FIG. 7, the light source 11 may emit light to a light path changing member 40 such as a prism or a mirror which changes a direction of the light. In this case, the light path changing member 40 is structured and disposed so that the light whose direction is changed by the light path changing member 40 is irradiated to the main body frame 6. As described above, it may be structured that the light source 11 emit light to the main body frame 6 through the light path changing member 40 such as a prism or a mirror.

In the embodiment described above, the entire main body frame 6 is a light transmission part which is formed of a light transmissive member. However, the present invention is not limited to this embodiment. For example, a part of the main body frame 6 may be a light transmission part which is formed of a light transmissive member. For example, it may be structured that the second frame 22 is formed of a light transmissive member and the first frame 21 is formed of a member which does not transmit light. In other words, the second frame 22 may be a light transmission part. Further, it may be structured that a part of the second frame 22 is formed of a light transmissive member and the other portion of the second frame 22 is formed of a member which does not transmit light. In other words, a part of the second frame 22 may be a light transmission part formed of a light transmissive member. In this case, the light source 11 emits light toward the light transmission part. Also in this case, the inside of the card passage 10 is illuminated by light irradiated to the light transmission part and thus visibility of the portion into which a card 2 is actually inserted can be further enhanced in comparison with the conventional case.

Figure 8A:
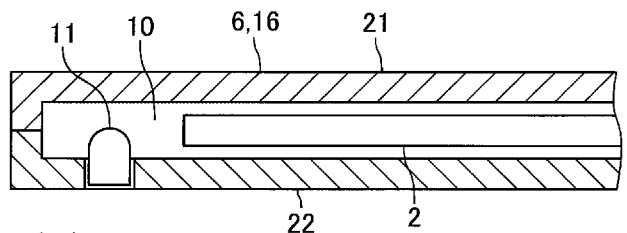
FIGS. 8(A) and 8(B) are schematic views for explaining arrangement of a light source and its surrounding part in accordance with another embodiment of the present invention.
Figure 8B:
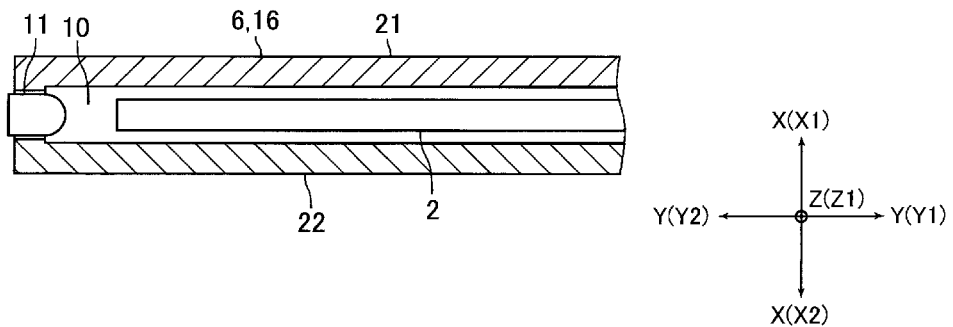

In the embodiment described above, the light source 11 is disposed on the outer side of the card accommodation part 16. However, the present invention is not limited to this embodiment. For example, as shown in FIGS. 8(A) and 8(B), a part or the entire light source 11 may be disposed in the inside of the card accommodation part 16. In other words, a part or the whole of the light source 11 may be disposed in the inside of the card passage 10. In this case, the main body frame 6 may be formed of a light transmissive member or a member which does not transmit light. For example, the main body frame 6 (in other words, the first frame 21 and the second frame 22) may be formed of resin material having a white color or the like which does not transmit light. Also in this case, the inside of the card passage 10 is illuminated by light emitted from the light source 11 and thus visibility of the portion into which a card 2 is actually inserted can be further enhanced in comparison with the conventional case. Further, in this case, the light source 11 is disposed on the rear end side of the card passage 10 so as not to interfere with the rear end of an inserted card 2.

In the embodiment described above, the card reader 1 includes one light source 11 but the card reader 1 may include two or more light sources 11. When the number of the light source 11 is increased, the inside of the card passage 10 is illuminated further brighter. Further, in the embodiment described above, the light source 11 is an LED but the light source 11 may be a lamp or the like other than an LED.

In the embodiment described above, the main body frame 6 is structured of the first frame 21 and the second frame 22 which are divided into two pieces in the right and left direction. However, the present invention is not limited to this embodiment. For example, the main body frame 6 may be structured of two frames which are divided in the upper and lower direction or in the front and rear direction. Further, the main body frame 6 may be formed of one frame.

In the embodiment described above, the front face frame 5 is formed in a roughly rectangular shape when viewed in the right and left direction. However, the present invention is not limited to this embodiment. For example, the front face frame 5 may be formed in a roughly "U"-shape when viewed in the right and left direction. In other words, the front face frame 5 may be structured of a portion which is disposed so as to cover the head disposing part 15, a portion which is disposed so as to cover the card guide part 19, and a portion in a tube-like shape for crushing the sealing member 8 in a radial direction from an outer peripheral side of the sealing member 8. In this case, a part of the front end side of a card 2 inserted into the card reader 1 is exposed in a cutout part which is formed between the portion disposed so as to cover the head disposing part 15 and the portion disposed so as to cover the card guide part 19.

In the embodiment described above, the card reader 1 includes the front face frame 5 but the card reader 1 may include no front face frame 5. Further, in the embodiment described above, the cutout part 20 is formed between the head disposing part 15 and the card guide part 19 of the main body frame 6. However, no cutout part may be formed in the main body frame. In other words, the main body frame structuring a card feeding passage may be, for example, formed in a flat rectangular prism shape.

In the embodiment described above, the sealing member 8 is disposed on the seal disposing groove 30 and is crushed toward an inner side from an outer side in the radial direction by the inner peripheral face 5k of the seal pressing part 5h. However, the present invention is not limited to this embodiment. For example, a sealing member may be disposed so as to be crushed by the front face frame 5 and the main body frame 6 in the front and rear direction. In this case, the sealing member is, for example, formed in a thin plate-like shape.

In the embodiment described above, the card reader 1 includes the magnetic head 3. However, the card reader 1 may include IC contacts contacting with an IC chip fixed on the surface of a card 2 and/or a communication antenna for performing communication with an antenna incorporated into the card 2 in addition to the magnetic head 3 or instead of using the magnetic head 3. In this case, the IC contacts and the communication antenna are attached to the main body frame 6 directly or through an attaching member. Further, the card reader 1 may include a printer for performing printing on the surface of a card 2 and/or a scanner for reading characters printed on the surface of a card 2, or the like in addition to the magnetic head 3 or instead of using the magnetic head 3. Also in this case, the printer and the scanner are attached to the main body frame 6 directly or through an attaching member. As described above, the main body frame in accordance with the present invention is attached with an information reading and recording means such as a magnetic head 3 for performing reading of information recorded on a card 2 and recording of information to a card 2.

In the embodiment described above, the card reader 1 is a so-called dip type card reader. However, a card reader to which the structure of the present invention is applied may be a so-called swipe type card reader in which magnetic information of a card 2 is read while the card 2 is moved along a groove-like card passage which is formed shallower than a width in a short widthwise direction of the card 2. Further, a card reader to which the structure of the present invention is applied may be a card feeding type card reader which includes a feeding mechanism for a card 2. In this case, it may be structured that a card 2 is taken into the inside of the card reader until a front end of the card 2 is not visible or, when the card 2 is taken into the inside of card reader, a front end side of the card 2 is exposed in the front face side of the card reader.

In the embodiment described above, the card reader 1 is mounted and used in a host device such as a fueling machine of a gasoline station and the card reader 1 is used under an environment where liquid is used. However, the present invention is not limited to this embodiment. For example, a card reader to which the structure of the present invention is applied may be used under an environment where liquid is not used. For example, the card reader may be mounted on a host device such as an ATM or a game machine which is used under an environment where liquid is not used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader for use with a card, the card reader comprising:

a main body frame with a card passage structure where the card that is inserted is passed;

a front face frame comprising a card insertion port into which the card is inserted, wherein the front face frame is attached to a front face side of the main body frame;

a light source which illuminates an inside of the card passage, wherein the entire main body frame is made of a light transmission part, and when viewed from a front face side of the card reader, the inside of the card passage is visible through the card insertion port;

wherein the light source is disposed at a position where light is irradiated toward the light transmission part in a thickness direction of the card which is substantially perpendicular to a passing direction of the card;

wherein the main body frame is provided with a card guide part structured to guide the card inserted through the card insertion port and a card accommodation part into which a rear side of the card being inserted through the card insertion port is accommodated;

wherein the main body frame is structured of a first frame and a second frame, wherein the first frame and the second frame are rectangular frames fixed to each other at four corners thereby forming the card accommodation part;

wherein the first frame comprises, at an end opposite to the front face frame, an outer peripheral end wall part that extends from the first frame in a direction approximately perpendicular to the passing direction of the card;

wherein, the first frame and the second frame are configured such that a groove part is provided between the outer peripheral end wall part and an end of the second frame; and a sealing material is provided within the groove part;

wherein the front face frame is provided with a front face part structuring a front face of the card reader, a tube part extending from the front face part toward the main body frame, and a finger insertion part which is formed on an inner side of the tube part so as to be recessed from the front face part toward the main body frame such that a user's thumb and finger are capable of being inserted;

wherein the card insertion port is formed in the front face of the front face part and an opening part in a slit shape is formed in the finger insertion part at a position aligned with the card insertion part to accommodate passage of the card through the front face part;

wherein the card guide part is provided within the tube part and aligned with the opening part such that the card guide part is visible and accessible by the user;

wherein the front face frame is formed of a member which does not transmit light so that, when viewed from the front face side of the card reader, only the card guide part of the main body frame is visible through the opening part.

2. The card reader according to claim 1, further comprising a sealing member which is disposed between the front face frame and the main body frame, wherein when a front face side of the card reader is referred to as a front side and a rear face side of the card reader is referred to as a rear side, the sealing member is disposed on a front side with respect to the card accommodation part, and the light source is disposed on a rear side with respect to the sealing member and is disposed on an outer side with respect to the card accommodation part.

3. The card reader according to claim 1, wherein when insertion of the card into the card reader is completed, a part of the card is exposed on a front face side of the card reader.

4. The card reader according to claim 1, wherein the first frame and the second frame are made of a polycarbonate or a polyacetal material.

* * * * *